Fig. 4. — Graph illustrating typical Variation in Force exerted by Spring Means 32 for various Fluid pressure values in Chamber of Hydraulic Means 48 of Figure 1.

INVENTOR.
ARTHUR E. VOGEL
BY Schmieding and Fultz
ATTORNEYS

June 12, 1962     A. E. VOGEL     3,038,739

CONTROL SYSTEM FOR VEHICLE SUSPENSION

Filed Oct. 19, 1955     9 Sheets-Sheet 7

INVENTOR.

ARTHUR E. VOGEL
BY Schmieding and Fultz
ATTORNEYS

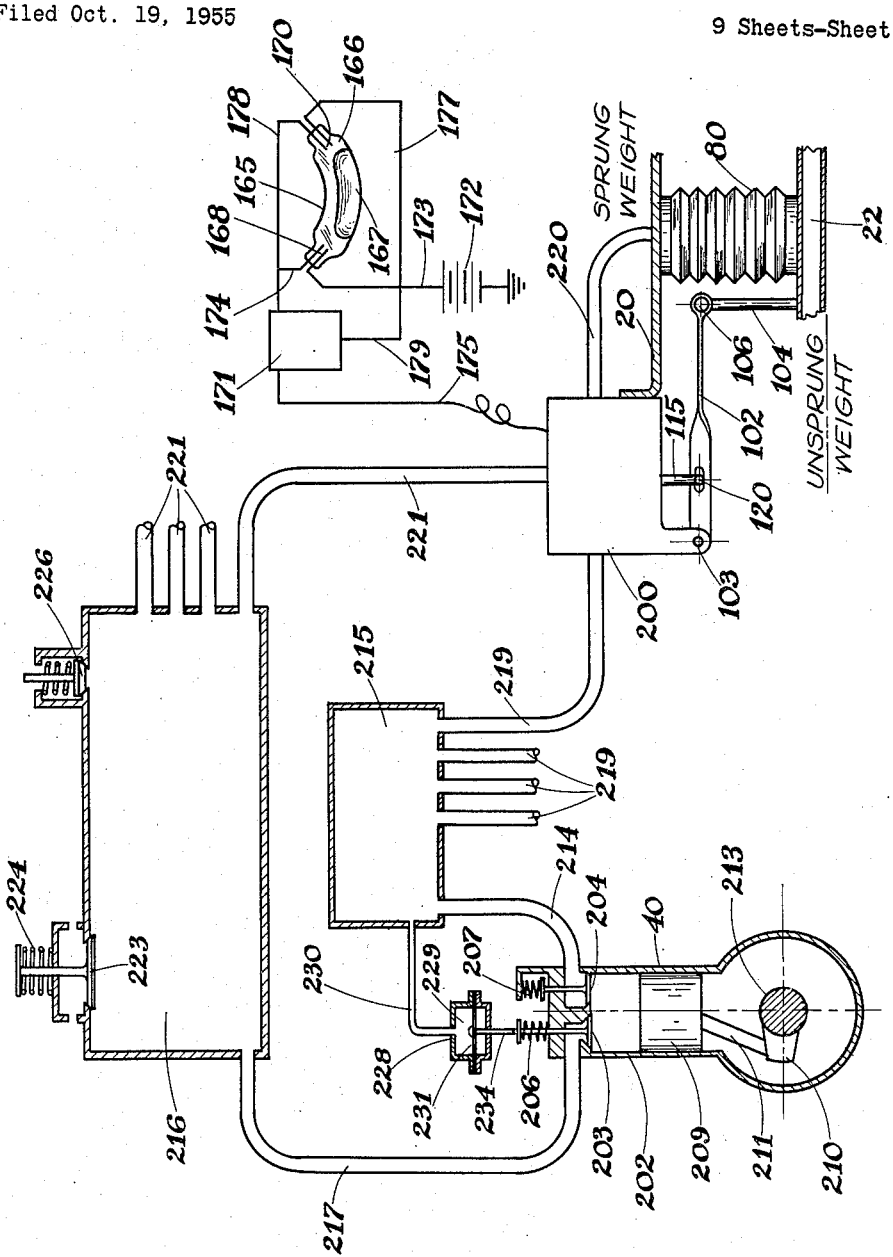

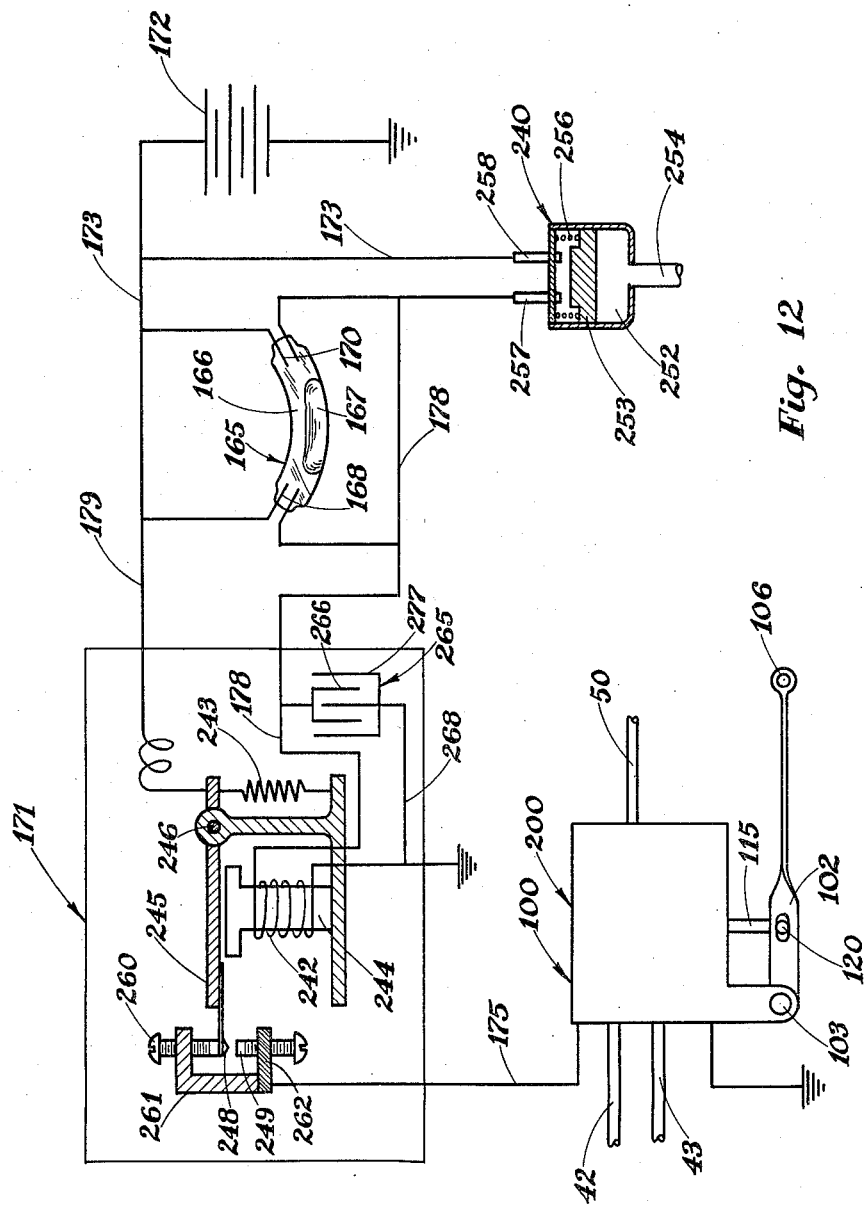

United States Patent Office 3,038,739
Patented June 12, 1962

3,038,739
CONTROL SYSTEM FOR VEHICLE SUSPENSION
Arthur E. Vogel, Columbus, Ohio, assignor, by direct and mesne assignments, of one-half to Dawson-Vogel Engineering Company, one-fourth to Warren H. F. Schmieding, and one-fourth to Palmer Fultz, all of Columbus, Ohio
Filed Oct. 19, 1955, Ser. No. 541,337
34 Claims. (Cl. 280—112)

The present invention relates to suspension system for vehicles and more particularly to a novel apparatus for automatically controlling such systems.

This application is a continuation-in-part of co-pending application Serial Number 519,079 of Arthur E. Vogel filed June 30, 1955, now abandoned.

In general, the present apparatus is applied to motor vehicles of the type which comprise a sprung weight portion supported by four unsprung weight portions each of which includes a wheel and an independent spring means. The apparatus of the present invention includes a separate control means for each of said spring means arranged to increase and decrease the force exerted by each spring means independently of the other spring means. In addition, each control means is provided with a separate detector means adapted to sense relative movement, from a predetermined suspension configuration, between the sprung and unsprung portions at the particular spring means being controlled.

When the vehicle encounters inertia forces in negotiating a curve, the spring means towards the center of the curve normally unload stored spring energy in a manner which is detrimental to stability and consequently dangerous to the occupants. With the present invention applied, however, the previously mentioned detector means sense any tendency for the inner side of the sprung weight portion of the vehicle to move upwardly from the inner unsprung weight portions such as occurs when the sprung weight portion of a vehicle tends to lean outwardly in a curve. When such tendency is sensed, the appropriate control means are rapidly and automatically actuated, in a controlled manner, to decrease the upwardly directed force exerted by the spring means at the side towards the center of the curve being rounded. Moreover, the appropriate detector means sense the magnitude of relative movement between the sprung and unsprung portions, and command the respective control means to decrease the force exerted by an appropriate amount to maintain said sprung and unsprung portions at said predetermined relative configuration under the various magnitude of centrifugal force to which the vehicle is subjected.

In addition to the above described functioning of the present system, such apparatus is adapted to provide a time lag in the response of said control means to said detector means when normal straight road conditions are being encountered. Accordingly, when road-imposed impacts are encountered at a particular spring means, the unsprung weight portion thereat will depart upwardly and downwardly and effect movements of short time duration without effecting any substantial change in the force exerted by the spring means. When the vehicle is entering a curve, however, it is desirable to effect rapid response of the control means to inertia forces so as to achieve roll stability without the presence of an undesirable transition period at curve entry. Such undesirable transition period would occur, at the time of curve entry, if the above mentioned time delay were retained operative when centrifugal forces are encountered since then the vehicle would start to roll or lean prior to a delayed action of the control means. Accordingly, the above mentioned time delay, required to prevent actuation of the control means when road imposed impacts are encountered, in straight road operation, is automatically rendered inoperative when the vehicle encounters centrifugal forces in entering a curve. Hence the control means will rapidly apply anti-roll corrections at the time of curve entry by the vehicle, yet such control means is non-sensitive to road imposed impacts.

As an additional advantage of the invention, when the vehicle is subjected to various degrees and distributions of static loads, the detector and control means at each of the independent spring means effect an appropriate sensing and produce a corresponding controlled variation in the force exerted by each spring means to maintain said predetermined suspension configuration at all the spring means of the vehicle and for all magnitudes and distributions of static load to which the vehicle is subjected.

It is therefore an object of the present invention to provide a control system which permits completely independent suspension operation at each of the four unsprung portions of a vehicle, with each of said portions being adapted to sense the particular condition to which it is being subjected, and to make an appropriate corresponding variation in the force exerted by its respective spring means. As a result, improved cornering characteristics and riding comfort are realized under all road conditions to which the vehicle is subjected.

It is another object of the present invention to provide a control system for vehicle suspensions adapted to maintain a normal suspension configuration between sprung and unsprung weight portions of a vehicle, said control system being adapted to vary the force exerted by the spring means of the vehicle by transferring fluid energy to and from such spring means. Such transfer of fluid energy is instituted after a time delay to prevent response of the control system to road imposed impacts of short time duration. After the control system returns the sprung and unsprung weight portions to normal configuration, however, the transfer of fluid is caused to cease without such time delay whereby the sprung and unsprung weights are positively arrested at normal configuration without the occurrence of hunting or oscillation of the system above and below the normal configuration datum.

It is another object of the present invention to provide a control system for vehicle suspensions which system includes a novel inertia responsive switch means that serves to rapidly render inoperative a time delay mechanism in the control system when the vehicle enters a curve so that the control system will effect anti-roll corrections at the outset of the curve. The novel switch means further includes a holding relay for automatically retaining the time delay mechanism inoperative for a time interval subsequent to completion of the curve so that the control system will rapidly remove the previously applied anti-roll correction which was required in the curve. Hence the vehicle will not remain in a banked configuration for a period after the vehicle completes the curve and the passengers of the vehicle will not be subjected to transition sensations as the vehicle leaves a curve and enters a stretch of straight road.

It is still another object of the present invention to provide a control system for vehicle suspensions of the type wherein a compressible fluid, such as air, is transferred into and out of sealed flexible casings, or air springs, connected between the sprung and unsprung weights of the vehicle. According to the present invention, the expenditure of fluid energy required to control the suspension system is decreased, through use of a novel fluid circuit for the system, whereby savings in horsepower consumed by the system are realized.

Further objects and advantages of the present invention will be apparent from the following description, reference being had to the accompanying drawings wherein preferred forms of embodiments of the invention are clearly shown.

In the drawing:

FIGURE 9 is a diagrammatic view of a novel control system and fluid circuit constructed according to the present invention;

FIGURE 12 is a diagrammatic view showing a novel electric control apparatus utilized with the control means of the present invention and comprising still another aspect thereof.

Figure 1:
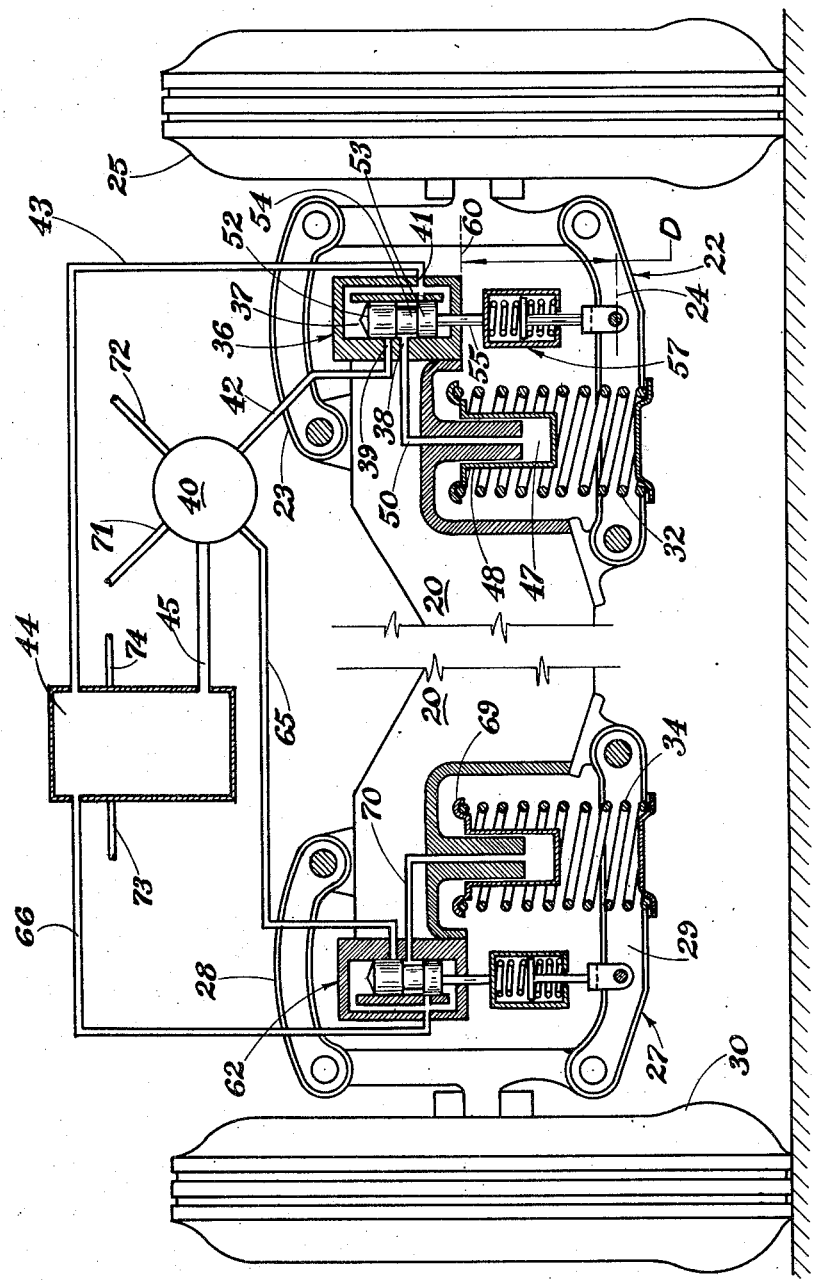
FIGURE 1 is a front schematic view showing the suspension system of a motor vehicle with a control system constructed according to the present invention applied thereto.

Referring to the drawing, FIGURE 1 schematically illustrates a motor vehicle, as viewed from the front. Such vehicle includes a sprung weight porton 20 supported by four unsprung weight portions each of which includes a wheel. The left front unsprung portion is indicated generally at 22 and comprises an upper control arm 23, a lower control arm 24, and a wheel 25.

The right front unsprung portion is indicated generally at 27 and comprises an upper control arm 28, lower control arm 29 and a wheel 30.

A spring means 32 is provided between the sprung portion 20 and the unsprung portion 22. An identical spring means 34 is provided at the other side of the vehicle.

Referring particularly to the left front spring means 32, a control means is supported by the frame and indicated generally at 36. Such control means forms a chamber provided with ports 38, 39, and 41.

Control means 36 is further provided with a spool 52 which includes a surface 53, slideably fitted in a cylinder 37, and a necked portion 54. When spool 52 moves upwardly, a source of high pressure fluid, such as a pump 40, delivers fluid to a hydraulic means 48 since port 38 is then communicating with port 39 by means of necked portion 54.

When spool 52 moves downwardly, from its position in FIGURE 1, chamber 47 of hydraulic means 48 communicates with reservoir 44 since the ports 38 and 41 are connected by necked portion 54 of the spool.

When spool 52 is in the normal static weight configuration illustrated in FIGURE 1, the chamber 47 of hydraulic means 48 is isolated from both pump 40 and reservoir 44, and the pump and reservoir are isolated from each other, since spool 52 is then effecting isolation of ports 38, 39, and 41, one from the other.

A detector means 55 operatively connects the lower end of spool 52 with the unsprung portion 22 whereby upward movement of sprung portion 20 serves to move spool 52 downwardly relative to its housing and downward movement of sprung weight 20 serves to move spool 52 upwardly relative to its housing.

An appropriate lost motion connection 57 may be provided to allow greater relative movement, between the sprung and unsprung portions, than the amount of movement required for spool 52.

In operation, when the left side of the sprung portion 20 tends to move upwardly, for any reason, as would be caused by centrifugal force when the vehicle is entering a curve to the left, then surface 53 of the spool moves downwardly placing chamber 47 of hydraulic means 48 in communication with port 41 and hence with the low pressure side of the system leading to reservoir 44. This causes the pressure in chamber 47 to be relieved whereby the force exerted upwardly on sprung portion 20 is decreased. Hence the particular spring means 32 unloads to the reservoir, stored energy which would otherwise augment the upsetting tendency of the centrifugal force being encountered. The greater the tendency of the left side of sprung weight 20 to move upwardly, the greater will be the release of fluid pressure at port 41 and the greater will be the decrease in the force being exerted by spring means 32. As a result, the control system will maintain the sprung portion 20 at the level of normal configuration datum line 60, and at a constant distance D from the unsprung portion 22.

When the sprung portion 20 tends to move downwardly, as would occur when the vehicle is cornering to the right, or when the front left portion of the vehicle is subjected to an increase in static load, then in such instances member 33 moves spool 52 upwardly in its casing which places port 39 in communication with port 38. Accordingly, chamber 47 is subjected to high pressure fluid from pump 40 whereby the force exerted upwardly, by spring means 32, is increased in magnitude. The greater the tendency of sprung portion 20 to move downwardly, from datum line 60, the greater will be the increase in fluid effect in chamber 47 and the greater will be the increase in force being exerted by spring means 32. Hence the control system will tend to maintain sprung portion 20 at normal configuration datum line 60, and at a constant distance D from the unsprung portion 22.

With continued reference to FIGURE 1, a right front control means is indicated generally at 62, with such control means being connected to pump 40 and reservoir 44 by lines 65 and 66, respectively. The operation of right front control means 62 is identical to that just described in connection with left front control means 36. The hydraulic spring loading means 69 is connected to control means 62 by line 70.

Although the two rear suspensions, and their corresponding detector and control means are not illustrated, such units are substantially identical to the front units. The partially illustrated high pressure lines 71 and 72, and low pressure lines 73 and 74, serve to connect such rear control units to the pump 40 and reservoir 44, respectively.

Figure 2:
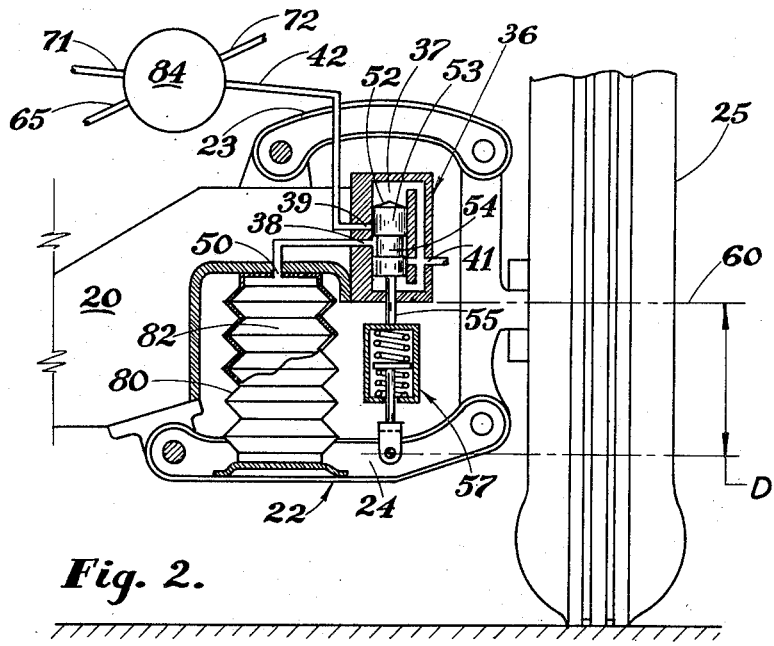
FIGURE 2 is a partial front schematic view of a vehicle suspension system with a second aspect of the present invention applied thereto.

Reference is next made to FIGURE 2 wherein a second aspect of the present invention is schematically illustrated. A control means of the same type as that of FIGURE 1 is again generally indicated at 36, and all of the components and elements of FIGURE 2, which correspond to those of FIGURE 1, are indicated by identical numerals.

The aspect of FIGURE 2 differs from that of FIGURE 1 in that the resilient means between the sprung and unsprung portions are provided by flexible casings, such as the one illustrated at 80. Casing 80 forms a sealed chamber 82 adapted to receive a compressible fluid, such as air, from a high pressure source such as compressor 84. Chamber 82 is further adapted to exhaust fluid through lines 50, and port 41 to a zone of relatively low pressure such as atmosphere, or to a low pressure reservoir of the type shown at 216 in FIGURE 9.

It will be noted that in the aspect of FIGURE 2 the need for the hydraulic means 48 of FIGURE 1 is eliminated and the line 50, leading from control means 36, is connected directly to chamber 82 and the magnitude of force exerted by casing 80 is varied merely by varying the pressure in chamber 82 according to the command from the detector means as previously set forth in the description of the operation of the apparatus of FIGURE 1.

Figure 3:
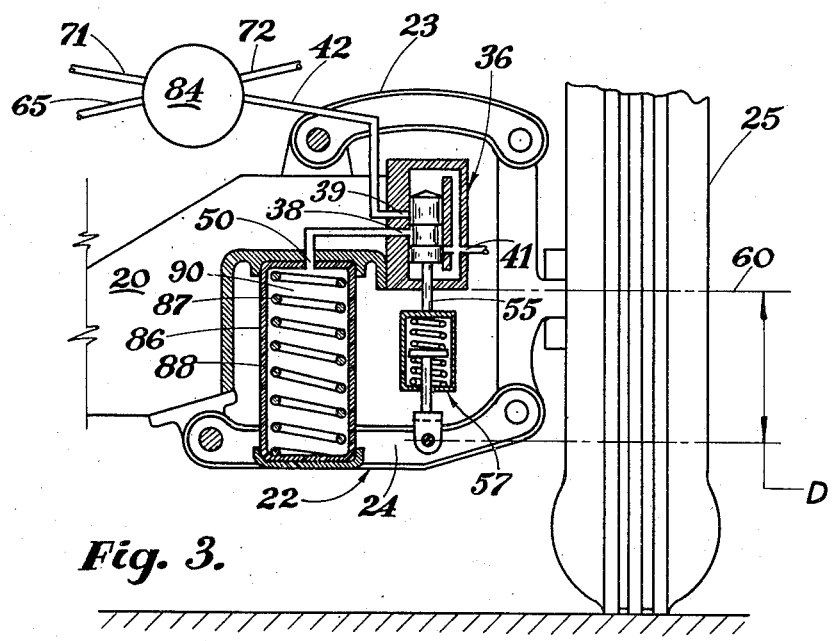
FIGURE 3 is a partial front schematic view of a vehicle suspension system with a third aspect of the present invention applied thereto.

Reference is next made to FIGURE 3 which schematically illustrates still another aspect of the present invention. The various components and elements, and the functions thereof, are identical to those of FIGURE 2 except that the resilient means 86, between the sprung and unsprung portions, each consists of a combination unit which includes both a coil spring 87 and a flexible casing 88. The spring 87 may be disposed within the sealed chamber 90 formed by the casing 88 in the manner illustrated.

As is the case with FIGURE 2, no hydraulic means 48 is required for the aspect of FIGURE 3 since a compressible fluid, such as air, is introduced and exhausted directly into and from chamber 90 by the action of control means 36 and in response to the command of the detector means in the manner previously set forth in describing the operation of FIGURE 1.

Figure 4:
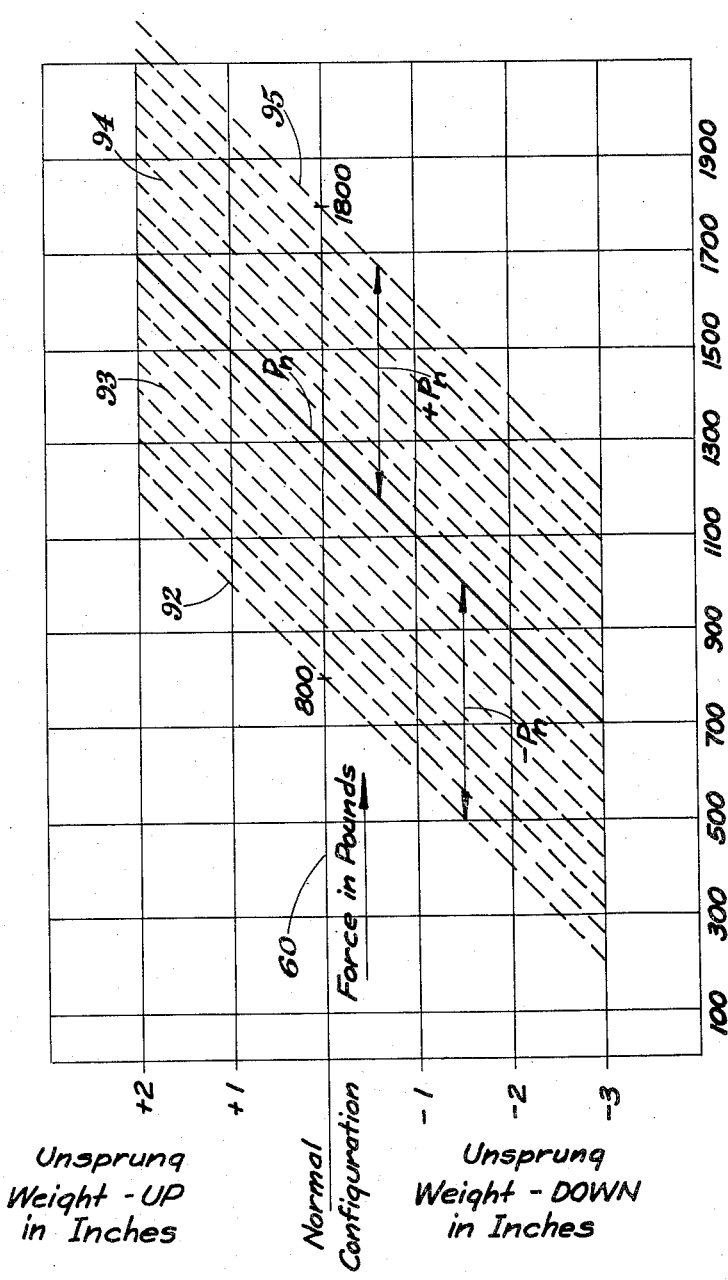
FIGURE 4 is a graph providing a typical illustration of the function and effect of the control system of FIGURE 1.

Reference is next made to FIGURE 4 which graphically illustrates the controlled variations in force exerted, between sprung and unsprung weight, by spring means 32 of the apparatus of FIGURE 1. Such force variations are shown for various pressures produced in the chamber 47 of hydraulic means 48. The normal pressure required to support the static load of the vehicle is represented by line P—N, with such pressure being arbitrarily shown to be 1300 pounds, a reasonable value for a typical motor vehicle.

In FIGURE 4 the arrow designated plus P—N represents increases in the pressure in hydraulic means 48 and the arrow designated minus P—N represents decreases in the pressure in such hydraulic means.

It will be understood that the pressure can be varied below P—N, down to an arbitrarily selected lower limit represented by line 92, and above P—N, to an arbitrarily selected upper limit represented by line 95. An infinite number of spring effects can be produced by the control means previously described, and as required, throughout the range between the upper and lower limits represented by the lines 93 and 94. It should be noted, with the apparatus of FIGURE 1, that although the magnitude of force exerted by spring 32 is varied, the rate of the spring means will remain substantially constant throughout the range of force variations. This condition is illustrated by the parallelism, or equal slopes, of the family of lines represented at 92, 93, 94, and 95.

With the apparatuses of FIGURES 2 and 3, however, not only will the force of the resilient means 80 and 86 be varied but, in addition, the rate of force change per unit distance of suspension travel will also vary with changes in the pressure present in chambers 82 or 90. This condition is illustrated for the apparatus of FIGURE 2, in the graph of FIGURE 5, by the different slopes of the various lines for the various arbitrarily selected pressure values. Here again, as was the case in FIGURE 4, line P—N represents the forces exerted, and the rate of force change for each unit distance of suspension travel, at a normal pressure required to support the static weight of the vehicle. Lines 1.25 P—N and 1.50 P—N illustrate the forces exerted, and the rate of force change per unit distance of suspension travel, at arbitrarily selected fluid pressures above P—N. The lines .50 P—N and .75 P—N illustrate the same characteristics for the lower pressure ranges below P—N.

Referring again to FIGURE 4 it will be noted that the lower limit of the force exerted is shown to be 800 pounds when the suspension is at normal configuration as depicted by line 92. This represents an arbitrarily selected maximum capable decrease of 500 pounds from the normal 1300 pounds exerted upwardly on the sprung portion of the vehicle. The availability of such decrease in the force of spring 32 is extremely important when the vehicle is cornering to the left with spring 32 towards the center of the curve, since, in such instance the decrease in upwardly exerted force prevents unloading of confined spring energy which unloading would otherwise augment centrifugal force in producing outward lean and perhaps upsetting of the vehicle.

Figure 5:
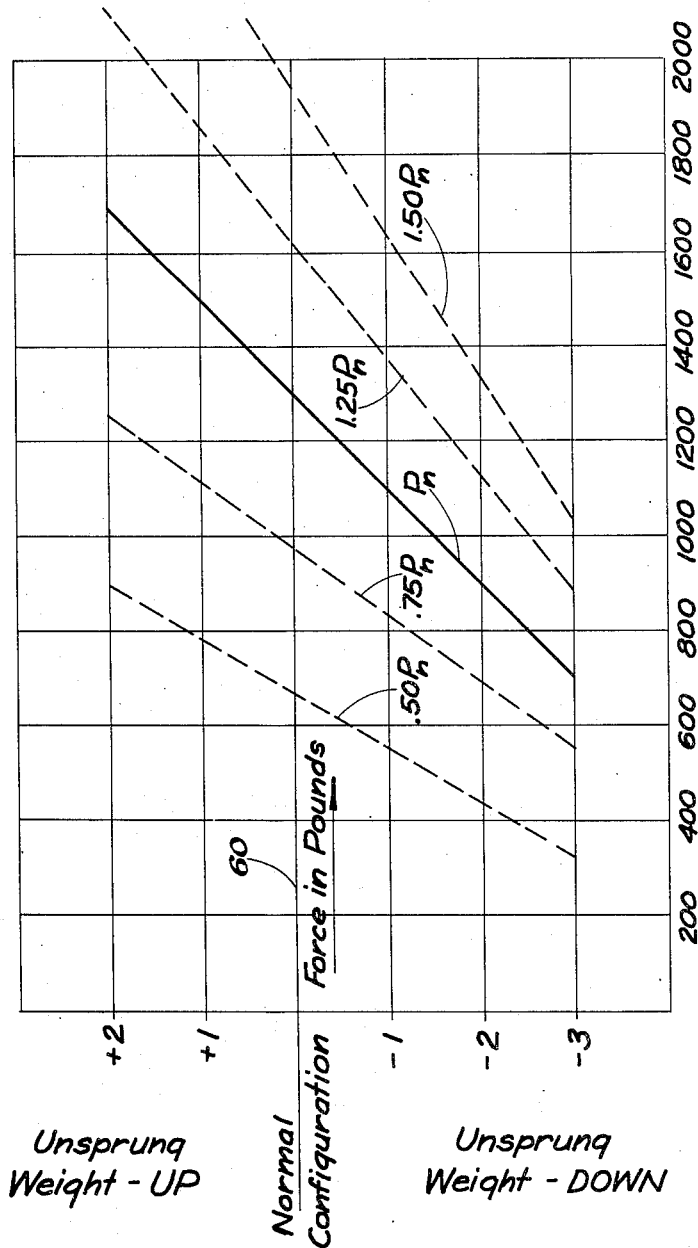
FIGURE 5 is a graph providing a typical illustration of the function and effect of the control system of FIGURE 2.

With further reference to the graphs of FIGURES 4 and 5, it should be pointed out that the decreases and increases in pressure, above and below the normal pressure P—N required to support the normal static weight, are applied in the controlled manner previously described so as to substantially maintain the previously described normal configuration distance D throughout the range of centrifugal forces encountered in cornering, and for the various static weight loadings and distributions to which the vehicle is subjected.

Figure 6:
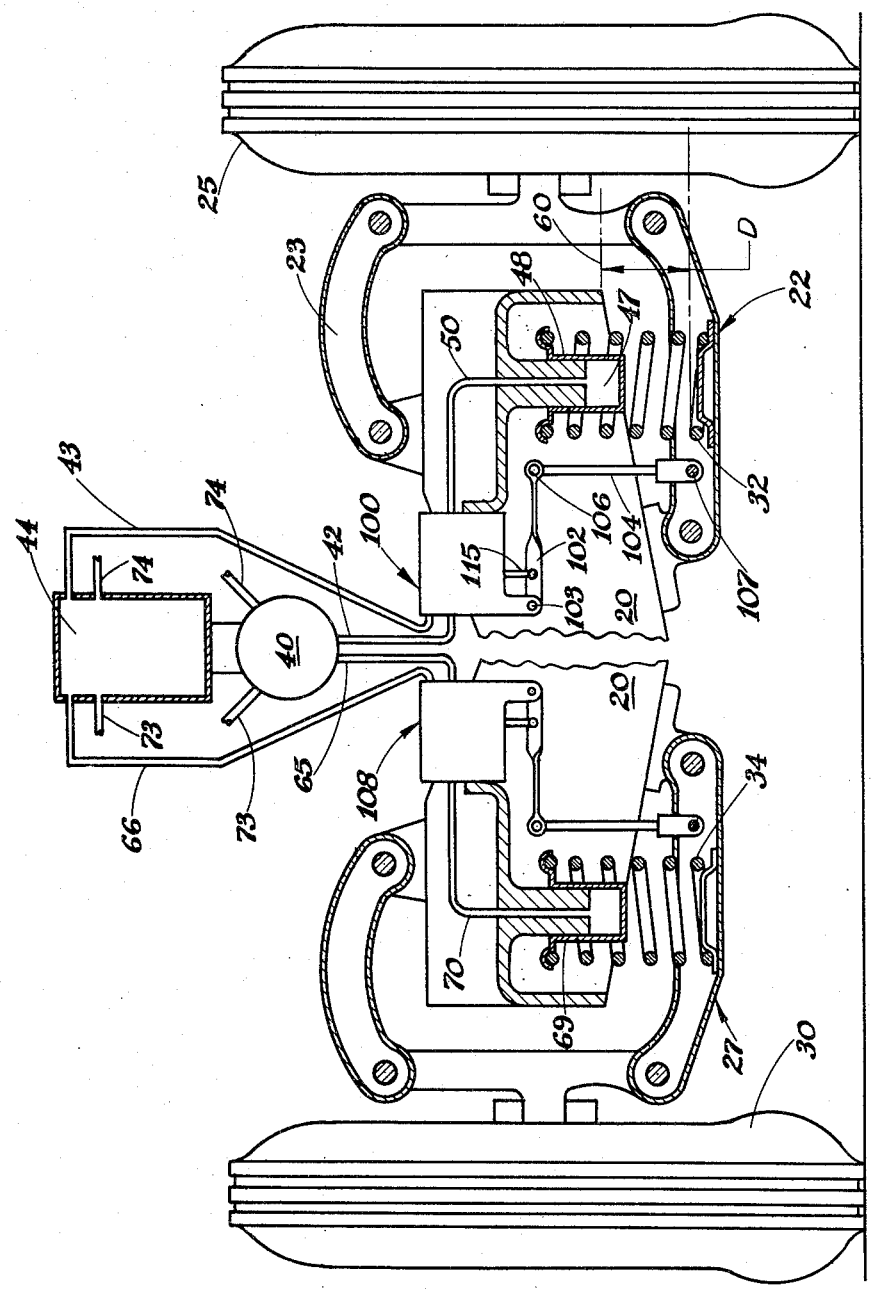
FIGURE 6 is a front schematic view of the suspension system of a motor vehicle to which a control system of the present invention has been applied, said control system representing a fourth aspect of the present invention.
Figure 7:
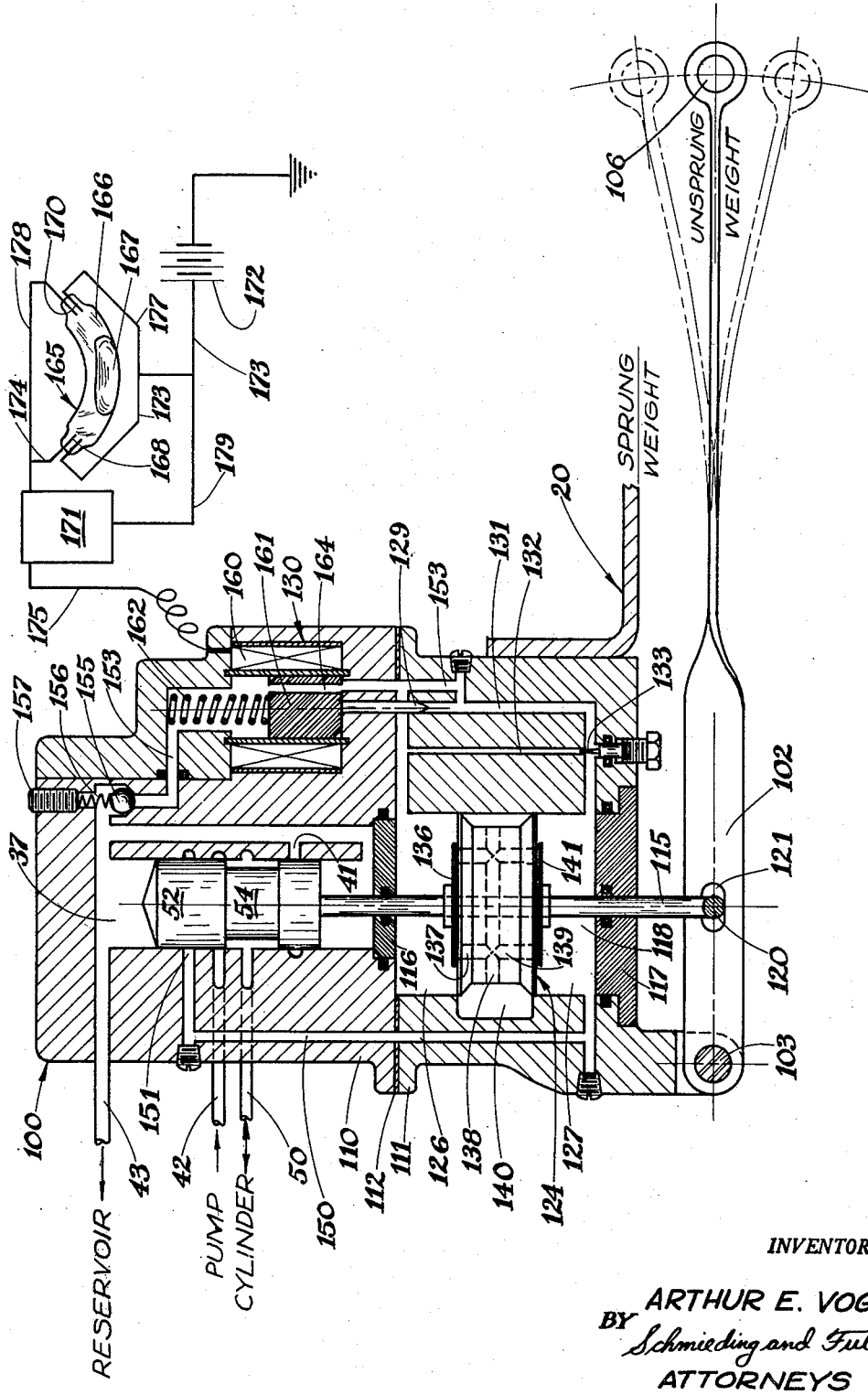
FIGURE 7 is a side sectional view of a control means comprising a portion of the system of FIGURE 6, the section being taken substantially along a vertical plane through the housing of said control means.

Reference is next made to FIGURES 6 and 7 which illustrate another aspect of the present invention. FIGURE 6 schematically illustrates the front view of vehicle suspension system similar to the system of FIGURE 1 and the components of the apparatus of FIGURE 6 which correspond to components of FIGURE 1 are designated by identical numerals. The system of FIGURE 6 differs from the system of FIGURE 1 in that a different control means 100 replaces the control means 36 and is mounted on the sprung weight 20 of the vehicle and is operatively connected to the unsprung weight 22 by means of a resilient arm 102 pivotally connected to control means 100 at the pivot 103. A link 104 is pivotally connected to resilient arm 102 at the pivot 106 and to unsprung weight 22 at the pivot 107.

Three separate identical control means may be used at each of the other three wheels with a left front control means 108 being visible in the view of FIGURE 6.

In general, the purpose of control means 100 and 108 is similar to that of the control means 36 previously described in that such control means is adapted to vary the pressure in a chamber, such as 47, to vary the force exerted by spring means 32 between the sprung and unsprung weights 20 and 22. Such force variations are effected in a controlled manner so as to maintain the distance D, between the sprung and unsprung weights, substantially constant for all variations in and distributions of static and inertia loads to which the vehicle is subjected during operation.

The internal structure of control means 100 differs considerably, however, from that of the previously described control means 36 as is seen in the sectional view of FIGURE 7 which view clearly illustrates the interior mechanism of such control means 100.

As seen in FIGURE 7, control means 100 includes an upper casing portion 110 joined to a lower casing portion 111 at a sealed junction 112.

Control means 100 further includes a spool 52 slideably fitted in a cylinder 37 and provided with a necked portion 54. When spool 52 moves upwardly, a source of high pressure, such as pump 40, delivers fluid through line 50 to the hydraulic means or cylinder 48 since line 42 is then connected to line 50 by necked portion 54 of the spool.

When spool 52 moves downwardly from the position illustrated in FIGURE 6, chamber 47 of hydraulic means or cylinder 48 is connected with reservoir 44 since the port 41, and hence the line 43, are connected to line 50 by the necked portion 54 of the spool.

When spool 52 is in the normal position illustrated in FIGURE 6, which is the case when no correction for static or inertia load variation is being made by the control means, then the chamber 47 of hydraulic means or cylinder 48 is isolated from both pump 40 and reservoir 44, and the pump and reservoir are isolated from each other, since spool 52 is then effecting isolation of the lines 42, 43 and 50 one from the other.

With continued reference to control means 100, spool 52 is connected to resilient arm 102 by a rod 115 which rod extends slideably through an upper removeable wall 116 and a lower removeable wall 117 of a chamber 118. The lower end of rod 115 is pivotally and slideably connected to resilient arm 102 by a pin 120 extended through a slot 121.

A valve movement retarding means, indicated generally at 124, is mounted on rod 115 and in sealed sliding engagement with the inner wall of chamber 118.

Retarding means 124 is illustrated in the normal position it occupies when the suspension system is in a normal configuration shown in FIGURE 6 in which configuration the sprung weight 20 is a normal static load distance D from the unsprung weight 22 and the spool 52 is effecting isolation of lines 42, 43 and 50 one from the other.

When retarding means 124 is urged upwardly or downwardly, from the normal position illustrated, fluid will be moved from an upper chamber portion 126 to a lower chamber portion 127 or from lower chamber portion 127 to upper chamber portion 126. So long as element 129 of a time delay valve 130 closes passage 131, as illustrated in FIGURE 7, fluid moving between chamber portions 126 and 127 must pass through a passage 132 provided with a restrictor 133 which may be formed as an adjustable threaded needle valve 133 carried by lower casing 111 and extended into the lower end of passage 132. It will be understood that the rate of movement of retarding means 124, either upwardly or downwardly from the normal position illustrated, is much slower when the element 129 is closing the larger passage 131 since, in such instance, the flow rate of fluid between chamber portions 126 and 127 is throttled by the restrictor 133. When element 129 of time delay valve 130 is removed from passage 131, however, the fluid can rapidly move between the chamber portions 126 and 127 and the retarding means 124, and spool 52 connected thereto, can move rapidly whereby corrections are rapidly instituted by control means 100.

When the time delay mechanism is operative, and rapid movement of retarding means 124 away from the normal position is prevented, then the resilient arm 102 will bend upwardly or downwardly with rapid relative movement between the sprung and unsprung weight portions, yet when one of such relative movements is retained for a time duration greater than the time delay of the system then such arm provides the necessary force for continuing the movement of retarding means 124 at the slow rate it must move when time delay valve 130 is closing passage 131. Hence it is seen that the resilient arm 102 allows rapid relative movement between sprung and unsprung weight portions 20 and 22 at times when movement of retarding means 124 is retarded and cannot follow such rapid relative movements. Accordingly, the control means is rendered inoperative when road imposed impacts of short time duration are encountered. When the vehicle encounters a static load change of relative long time duration, however, such as occurs when the number of passengers is increased or decreased, the resilient arm 102 will bend and continue to bias the retarding means 124 until slow movement thereof moves spool 52 to the appropriate position for the correction required to return the sprung and unsprung weight portions 20 and 22 to the normal configuration at which they are spaced a distance D apart.

When retarding means 124 is urged upwardly by resilient arm 102 as will occur when sprung weight 20 moves downwardly relatively to unsprung weight 22, an upper resilient valve member 136 is maintained closed by fluid pressure whereby fluid cannot pass through the passages 137, 138, or 139 to lower chamber 127. Hence fluid is moved either through restricted passage 132 or through both the restricted passage 132 and the larger passage 131 depending on whether or not time delay valve 130 is open or closed.

After retarding means 124 has been moved upwardly, either rapidly or slowly depending on whether or not the time delay valve 130 is opened or closed, such retarding means 124 will always move rapidly back to the normal position illustrated, after a correction has been made by the control means. Such rapid return of the retarding means 124 occurs when such retarding means is returning to the central position illustrated since the recess 140 is then in communication with lower chamber portion 127 whereby fluid pressure in such lower chamber portion 127 and recess 140 opens the resilient valve member 136 and fluid can pass readily through passages 137 and 138 and into upper chamber portion 126. Since the cross-sectional areas of passages 137 and 138 are much greater than the effective cross-sectional area of passage 132 at restrictor 133, the fluid transferred between chamber portions 127 and 126 will not slow down movement of retarding means 124 when such means is returning from an upper position until it reaches the normal position illustrated and closes by-pass recess 140.

When retarding means 124 is urged downwardly by resilient arm 102, as would occur when the sprung weight 20 rises relative to unsprung weight 22, then the lower resilient valve member 141 will be maintained closed by fluid pressure and fluid will pass from lower chamber portion 127 to upper chamber portion 126 either through the restricted passage 132 or through both the restricted passage 132 and the larger passage 131 depending on whether the element 129 of time delay valve 130 is in the closed or open position.

Retarding means 124 will return rapidly from a lower position to the normal position illustrated since upper chamber portion 126 is then in communication with recess 140 whereby fluid pressure opens resilient valve member 141 and fluid can pass directly through the passages 138 and 139 and into the lower chamber portion 127 without being forced through the restricted passage 132 until retarding means 124 closes by-pass recess 140.

When retarding means 124 arrives at the normal position illustrated, at the completion of a return movement after a correction has been made, the side of retarding means 124 forms a closure for recess 140 in the manner illustrated in FIGURE 7.

It is desirable to provide a circulating supply of fluid through upper and lower chamber portions 126 and 127 to keep the system free of dirt as well as to remove air from the system. It is not necessary that the volumetric rate of such circulation be great but it is desirable to provide some positive pressurized flow. Accordingly, a passage 150 is provided with an inlet port 151 confronting the outer surface of spool 52. The other end of passage 150 leads to the lower chamber portion 127. Since inlet port 151 is located intermediate the high pressure pump line 42 and the low pressure portion of cylinder 37, which portion is at reservoir pressure, and since a certain small volume of fluid will always leak along the confronting walls of spool 52 and cylinder 37, such fluid leakage will enter port 151 and flow through passage 150 to the lower chamber portions 126 and 127. To complete the circuit a return passage 153 is provided, with such passage leading from the passage 131 back to the portion of the interior of cylinder 37 which is at reservoir pressure. The outlet end of passage 153 is provided with a fluid actuated check valve 155 which opens at a predetermined pressure against the action of spring 156. A screw 157 is provided for varying the relief pressure at which check valve 155 opens, with such relief pressure being set at some value less than the fluid pressure at inlet port 151 of inlet passage 150 in order to provide the desired circulation through the time delay portion of the system.

It will be understood that the pressure available for pressurizing chambers 126 and 127 will depend on the location of port 151 relative to the distance between pressurized line 42 and the top spool 52 which is exposed to reservoir pressure. If the port 151 is centrally located between line 42 and the top of spool 52, and if the reservoir pressure is atmospheric, then the pressure available at port 151 will be approximately one half the pressure existing in high pressure line 42.

Referring next to the time delay control valve 130 of FIGURE 7, such valve includes a stationary solenoid 160 surrounding a moveable core 161 which core carries element 129. A spring 162 constantly urges core 161 and element 129 towards the closed position illustrated. When solenoid 160 is energized, however, core 161 is moved upwardly by the magnetic field of the solenoid towards a central position therein whereby the element 129 opens the larger passage 131 and the time delay mechanism is rendered inoperative in the manner previously described.

A passage 164 is provided through core 161 for the passage of fluid through the core whereby both the upper and the lower end of the core are subjected to the same fluid pressure. Hence the time delay control valve 130 is balanced with respect to fluid pressure of the system and movement thereof will be effected only by the action of spring 162 and solenoid 160.

The system of FIGURE 7 is provided with an inertia responsive control means to rapidly render the time delay mechanism inoperative when the vehicle is suddenly subjected to a horizontally exerted inertia force such as is the case when the vehicle enters a curve, or at the outset of a braking or accelerating operation. In these instances of vehicle operation it is desirable to rapidly institute an anti-roll correction at the entry of a curve, or to rapidly resist longitudinal pitching or "nose dive" of the front of the vehicle when the brakes are applied, or to rapidly resist longitudinal pitching of the vehicle during rapid acceleration thereof. By rapidly instituting the correction to be made by the control means, through rendering inoperative the time delay mechanism, lower control means pressures are required to effect stability and the passengers of the vehicle will not be subjected to unpleasant transition sensations as would be the case were the vehicle permitted to materially proceed into a roll or pitching movement before the appropriate correction is instituted by the control means 100.

With continued reference to FIGURE 7, a horizontally disposed mercury switch is generally indicated at 165. Such switch includes a tube 166 having inclined opposite ends provided with a first pair of contacts 168 and a second pair of contacts 170. A source of electric energy 172 is connected to one of the contacts 168 by wire 173 and the other of the contacts 168 is connected by wire 174 to a holding relay 171, later to be described herein, which relay is in turn connected to solenoid 160 by the wire 175. At the other end of tube 166 one of the contacts 170 is connected to the source of electric energy 172 by the wire 177 and the other of the contacts 170 is connected to the holding relay by the wire 178.

When the quantity of mercury 167 connects either the contacts 168 or the contacts 170 the solenoid 160 is actuated whereby the time delay mechanism is rendered inoperative. It will be understood that when the longitudinal axis of mercury switch 165 is disposed transversely to the longitudinal axis of the vehicle the mercury switch 165 will sense centrifugal force and render inoperative the time delay mechanism when the vehicle encounters a curve.

The same control means 100 can be also utilized to control longitudinal pitching or "nose dive" of the vehicle when the brakes are applied in slowing down or stopping. In such instances it is desirable to render inoperative the time delay mechanism of control means 100 so that an anti-pitch correction will be rapidly instituted before the vehicle has materially progressed into a pitched attitude. To accomplish this a brake operated switch 240, illustrated in FIGURE 12 and later to be described, may be connected in parallel with the mercury switch 165. Hence a single control circuit, using both mercury switch 165 and brake operated switch 240, can be utilized with control means 100 whereby such control means 100 will effect both antiroll corrections and anti-pitch corrections.

Figure 8:
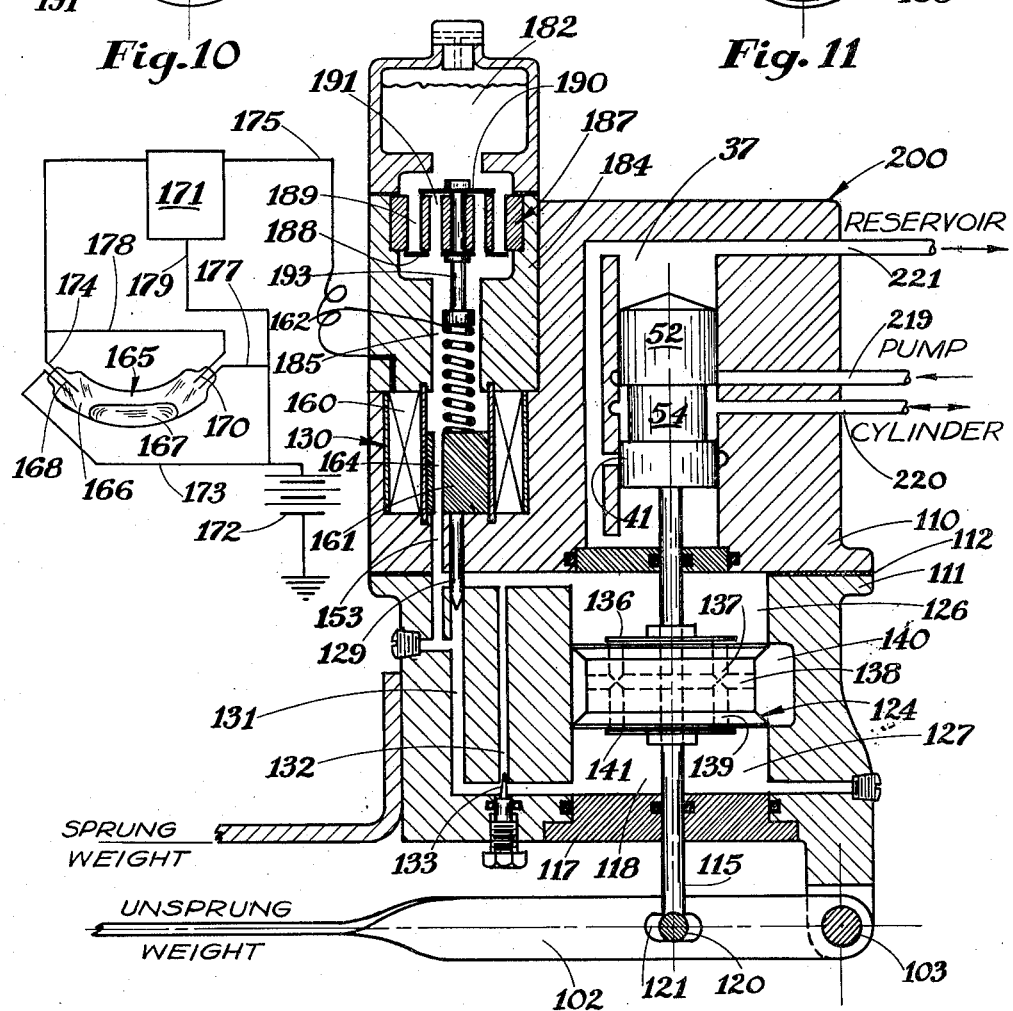
FIGURE 8 is a side sectional view of a control means constructed according to the present invention and utilized with a control system comprising a fifth aspect of the present invention. The section is taken substantially along a vertical plane through the housing of said control means.

Reference is next made to FIGURE 8 which illustrates still another aspect of the present invention. Such view is a section of a control means 200 adapted for use in a control for a suspension system wherein a compressible fluid, such as air, is utilized. In general, the control means 200 is adapted to vary the fluid pressure in a sealed flexible casing or air spring such as the casing or chamber 80 shown in FIGURES 2 and 9, or the combined coil spring and sealed flexible casing unit 86 shown in FIGURE 3.

The control means 200 functions to control the vehicle in substantially the same manner as control means 100 previously described. The structure of control means 200 differs, however, from that of control means 100, since, in the former the main valve mechanism, provided by spool 52, is used to regulate air and the retarding means 124 is operated in hydraulic liquid in chamber 118. Accordingly, the cylinder 37 must be completely sealed from the hydraulic chamber 118. Moreover, a hydraulic reservoir 182 is added to control means 200 to maintain fluid in the hydraulic chamber 118. Hence the air, used as the control fluid, is prevented from leaking into the hydraulic fluid used in connection with the time delay mechanism.

The control means 200 is suitable for use with the air spring system illustrated in FIGURE 9, later to be described, and, accordingly, the air lines 219, 220, and 221 are designated by identical numerals in each of the FIGURES 8 and 9 in order to more clearly relate the control means 200 to the other components of a suitable suspension control system in which such control means can be utilized.

It should further be pointed out that each of the elements of control means 200 which is identical to a corresponding element of control means 100 has been designated by an identical numeral.

A solenoid 160 and core 161 of a time delay valve 130 are, as in the case of control means 100, mounted in a recess in an upper casing portion 110. A separate casing portion 184 forms a vertical passage 185 which connects reservoir 182 with the chamber portions 126 and 127 by means of passage 164 through core 161 and passage 153.

For controlling the flow of liquid from reservoir 182 to the chamber portions 126 and 127, a fluid actuated valve unit, indicated generally at 187, is mounted in casing portion 184 below the reservoir 182. Fluid actuated valve unit 187 further provides an escape for any air bubbles which may be present in the hydraulic liquid contained in the control means 200. Such unit 187 includes a lower resilient valve member 188 which prevents the movement of liquid from chamber portions 126 and 127 through passages 189 to reservoir 182 when retarding means 124 is actuated. An upper resilient valve member 190 serves to retain passages 191 closed against fluid flow to reservoir 182 up to a predetermined fluid pressure required in chamber portions 126 and 127 for proper operation of the time delay mechanism located therein. The lower resilient valve member 188 is arranged to permit free passage of hydraulic liquid from reservoir 182 through passages 189 to chamber portions 126 and 127 so that such chambers are always maintained full of liquid notwithstanding any slight leakage which may be present in the hydraulic system.

Figure 10:
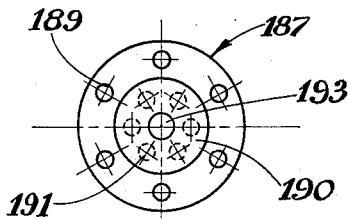
FIGURE 10 is a top elevational view of a fluid actuated valve unit comprising a portion of the control means of FIGURE 8.
Figure 11:
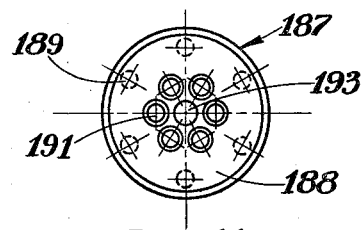
FIGURE 11 is a bottom elevational view of the fluid actuated valve unit of FIGURE 10.

FIGURE 10 is a top view of fluid actuated valve unit 187 showing upper resilient valve member 190 overlying the passages 191 but being of lesser diameter than the unit whereby the upper ends of passages 189 are uncovered. FIGURE 11 is a bottom view of valve unit 187 showing the lower resilient member 188 underlying the passages 189 and provided with holes corresponding with the locations of passages 191 whereby the lower ends of such passages are always open to the entry of fluid.

The upper and lower resilient valve members 188 and 190 are mounted to the upper and lower surfaces of the body of valve unit 187 by means of a shouldered pin 193 passing centrally through the body of the unit, with such pin being extended vertically downwardly into passage 185 to provide a retainer for a spring 162 adapted to constantly urge time delay valve 130 towards the closed position illustrated.

Referring now to FIGURE 9, here again the sealed flexible casing or chamber 80 is disclosed between the unsprung weight 22 and the sprung weight 20, as is clearly shown in FIGURE 2. The resilient arm 102 is connected to the rod 104 by the pivot pin 106. This rod 104 is suitably attached to the unsprung weight 22. The rod 115 connected to retarding means 124 is fastened to resilient arm 102 by a pin 120, and the arm 102 is connected to the valve casing 200 by pivot pin 103.

For the sake of simplicity, the compressor 40, is shown as of the reciprocating type including a cylinder 202, having an air inlet valve 203 and an air outlet valve 204. Valve 203 is upwardly urged towards the closed position by a spring 206, and valve 204 is downwardly urged towards the closed position by a spring 207. The compressor also includes a reciprocating piston 209 which is connected with a crank shaft 210 by a connecting rod 211. The shaft of the compressor is shown at 213. Compressed air is forced through the outlet valve 204 and line 214 to a high pressure reservoir 215. Air is fed to the compressor through valve 203 from a relatively low pressure reservoir 216 via line 217.

A control means 200 is provided for each of the sealed casings 80 and each is fed from the high pressure reservoir 215 through a line 219, control means 200, and line 220. Air is exhausted from each of the casings 80 to the pipe 220, control means 200, and line 221, one line being provided for each of the four chambers 80.

As previously described, it is desirable at times to quickly exhaust or partly exhaust the chamber 80 and, as previously described, this is accomplished by a control means like that shown at 200, and, as previously described, at this time the mercury switch 165 will have energized the solenoid operated time delay valve 130 within the control means 200.

Instead of exhausting the air from the chamber 80 to atmosphere, the lines 221 are connected to the relatively low pressure reservoir 216. This reservoir is provided with an inlet valve 223 which is urged to closed position by a spring 224. Such spring is of light construction and is merely used to hold the valve closed in the event that the air within the reservoir 216 is at atmospheric pressure. Normally, however, the pressure within reservoir 216 is substantially above atmospheric pressure. Air cannot escape reservoir 216 except through line 217 or a high pressure relief valve 226. As as example, the air pressure normally existing within the relatively low pressure reservoir 216 is at forty pounds per square inch, that in the chamber 80 is approximately 80 pounds per square inch, and that in the high pressure reservoir 215 approximately 120 pounds per square inch. Far less energy is expended in raising the pressure from 40 pounds per square inch to 120 pounds per square inch than would be expended in increasing the pressure of atmospheric air to 120 pounds per square inch. Thus by maintaining a pressure of 40 pounds per square inch, for example, in the relative low pressure reservoir 216, the system is operated more economically. The maximum high pressure within reservoir 215 can be controlled by a controller 228 which includes a chamber 229 connected by a line 230 to the reservoir 215. One of the walls 231 of the controller 228 is flexible and a rod 234 is engageable with the top of inlet valve 203. When the pressure within the reservoir 215 attains the desired maximum, valve 203 will be forced downwardly by the diaphragm 231 and rod 234 to partly open the inlet valve 203. By partially opening valve 203, and preventing it from returning to its seat, the air is merely oscillated between the line 217 and the cylinder 202. After the requirements of chambers 80 cause the pressure in high pressure reservoir 215 to drop below the maximum at which the controller 228 opens the intake valve 203, then the intake valve 203 will be returned to its seat and compressor 40 will resume operation and supply air to the high pressure reservoir 215.

Reference is next made to FIGURE 12 which diagrammatically illustrates an electrical sensing apparatus adapted to operate the time delay mechanisms of the previously described control means 100 or 200. A mercury switch 165 is provided with a pair of contact points 168 at one inclined end of a horizontal tube 166 and a second pair of contacts 170 at the other inclined end of horizontal tube 166. When the quantity of mercury connects either of the pair of contacts 168 or 170, which occurs when the vehicle encounters centrifugal force at curve entry, a solenoid 242 of holding relay 171 is energized and a core 244 becomes magnetized whereby pivoted arm 245 pivots on pin 246 and moves downwardly against the action of tension spring 243 to make contact between an upper contact 248 and a lower contact 249.

The mercury switch contacts 168 connect the source of electricity 172 with solenoid 142 by means of wires 173 and 178. The other mercury switch contacts 170 connect source 172 with solenoid 242 by means of wires 173 and 178.

A fluid actuated switch 240 is provided in parallel with mercury switch 165 to render inoperative the electrically operated time delay valve 130 located within the control means 100 or 200 when the vehicle encounters an inertia force which would cause longitudinal pitch of the vehicle. Such would occur when the vehicle is to be suddenly decelerated or stopped. Switch 240 includes a fluid chamber 252 fitted with a piston 253. A line 254 leading from chamber 252 can be connected to the hydraulic brake system of the vehicle, or to another suitable source of pressurized fluid. When chamber 252 is pressurized piston 253 moves upwardly against the action of a return spring 256 whereby piston 253 electrically connects a pair of contacts 257 and 258. The contacts 257 and 258 energize solenoid 242 of holding relay 171 with the source of electric energy by means of the wires 173 and 178.

The upper contact 248 of relay 171 is provided with an adjustable stop provided by a screw 260 adjustably carried by a dielectric bracket 261 mounted on metallic base 262 which base also adjustably supports lower contact 249. The dielectric bracket 261 insulates upper contact 248 from lower contact 249 when the former is in the upper position illustrated. The base 262 serves as a conductor between lower contact 249 and a wire 175 which leads to the solenoid 160 of time delay valve 130 within control means 100 or 200.

When contact 248 engages contact 249 by action of solenoid 242, then the solenoid 160 of time delay valve 130 is connected to the source of electric energy by wires 173, 179, arm 245, contact 248, contact 249, and wire 175. As seen in FIGURES 7 and 8, the element 129 opens the larger passage 131 whereby retarding means 124, and hence spool 52, will move rapidly to quickly institute an anti-roll or anti-pitch correction as required.

With continued reference to FIGURE 12, when the vehicle leaves a curve and enters a stretch of straight road it is desirable to continue to maintain the time delay mechanism inoperative for a period of time after the centrifugal force has ceased and the mercury switch 165 has broken contact, in order that the control means 100 or 200 can rapidly, without time delay, make corrections in the chambers 47 or 80, FIGURES 6 and 9, which corrections are required because centrifugal force is ceasing and the unequal spring forces, required in the curve to levelize the vehicle, are no longer required in the straight stretch of road being entered. Hence it is desirable to maintain the time delay mechanism inoperative and hence the solenoid 160 of the time delay switch 130, FIGURES 7 and 8, and the solenoid 242 of the holding relay 171 must both be maintained energized.

To maintain solenoid 242 and 160 energized after mercury switch 165 or the brake operated fluid actuated switch 240 has broken contact, a condenser 265 is connected in parallel with solenoid 242 of the holding relay. The plates 266 of the condenser are connected to wire 178 and plates 267 of the condenser are grounded by a wire 268.

When one of the switches 165 or 240 connects the source of electric energy 172 to the solenoid 242 of the holding relay, arm 245 is attracted downwardly to connect contacts 248 and 249 and condenser 265 is charged. So long as switch 162 or 240 is closed, the time delay switch 130 in the control means 100 or 200 will remain connected to the source 172 and receive electric current therefrom. When the closed switch 165 or 240 is opened, as occurs in coming out of a curve or when the brake pressure used in stopping is decreased, then the condenser 265 will begin to release its stored charge and continue to discharge for a time interval whereby solenoid 242 remains energized and the contacts 248 and 249 are maintained in engagement subsequent to opening of switch 165 or 240.

When condenser 265 discharges the arm 245 is moved upwardly against stop 260 whereby time delay valve 130 is closed and the control means 100 or 200 is rendered non-responsive to road imposed impacts of short time duration in the manner previously described.

It will be understood that each of the control means 100 or 200 of the present invention can be applied to each of the four wheels of a motor vehicle whereby anti-roll control, as well as corrections for variations in static weight changes, is effected at each of the four wheels of the vehicle. As an alternative, if it is desired to effect anti-roll control at only say the front wheels of the vehicle, then a control means 100 or 200 would be applied at each of the front wheels of the vehicle, and a structurally more simple and less expensive control means, without a time delay control valve such as solenoid operated time delay control valve 130, could be utilized at the rear wheels of the vehicle. In such latter instance, corrections for static weight distribution would be made by a control means at each of the four wheels, but only the control means 100 or 200 at the right front wheel and the control means 100 or 200 at the left front wheel would rapidly institute anti-roll corrections in the manner described in detail herein.

While the forms of the present invention as herein disclosed constitute preferred forms, it is to be understood that other forms might be adopted, all coming within the scope of the claims which follow.

I claim:

1. Apparatus for controlling the suspension system of a vehicle having sprung and unsprung weight portions connected by resilient means, which apparatus comprises; fluid actuated means for varying the force exerted by said resilient means between said sprung and unsprung portions; conduit means for conducting pressurized fluid to said fluid actuated means; valve means in said conduit means for controlling the flow of fluid therein; detector means operatively connected between said valve means and one of said weight portions; retarding means for varying the rate of movement of said valve means by said detector means; control means for the rate of movement of said retarding means; an electric actuator for said control means; and switch means in circuit with said electric actuator and including a first position for operating said electric actuator responsive to centrifugal force encountered by said vehicle in cornering in one direction and a second position for operating said electric actuator responsive to centrifugal force encountered by said vehicle in cornering in the other direction.

2. Apparatus for automatically controlling the suspension systems of a vehicle while negotiating a curve for improving the cornering characteristics thereof, said vehicle being of the type wherein four unsprung weight portions are each independently connected to a sprung weight portion by a resilient means, which apparatus comprises; separate detector means for each of said unsprung portions, each detector means serving to sense relative movement, between its respective unsprung portion and said sprung portion, away from a normal configuration; and separate control means including a chamber containing a fluid for each of said resilient means, each control means being variably responsive to a respective one of said detector means for varying the force effect in a respective one of said resilient means; time delay means for effecting a delayed response between each control means and its respective detector means whereby said variations in force effect are substantially prevented during road-imposed relative movements of short time duration, said time delay means including a movable element exposed to a chamber of hydraulic fluid; means forming a passage for receiving fluid translated by said movable element; a restrictor for said passage means, said restrictor being movable between a first fluid restricting position and a second fluid releasing position; and an actuator responsive to cornering of said vehicle in one direction for moving said restrictor from said first position to said second position and responsive to cornering of said vehicle in the other direction for moving said restrictor from said first position to said second position.

3. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; means forming a chamber in said fluid actuated means for receiving fluid from said pump and from which fluid is discharged to said zone; valve means including a first position wherein said chamber is sealed from both said pump and said zone, a second position wherein said chamber is connected only with said pump, and a third position wherein said chamber is connected only with said zone; valve actuating means for effecting movement of said valve means away from said first position to certain of said other positions responsive to variations in said distance between said portions, said valve actuating means serving to return said valve means from said certain of said other positions to said first position; and retarding means for varying the rate of movement of said valve means by said valve actuating means; means associated with said retarding means for imposing a resistance to movement of said retarding means when said valve means moves away from said first position; and means associated with said retarding means for providing relatively unrestricted movement of said retarding means when said valve means is returned to said first position.

4. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; means forming a chamber in said fluid actuated means for receiving fluid from said pump and from which fluid is discharged to said zone; valve means including a first positon wherein said chamber is sealed from both said pump and said zone, a second position wherein said chamber is connected only with said pump, and a third position wherein said chamber is connected only with said zone; valve actuating means for effecting movement of said valve means away from said first position to certain of said other positions responsive to variations in said distance between said portions, said valve actuating means serving to return said valve means from said certain of said other positions to said first position; retarding means for varying the rate of movement of said valve means by said valve actuating means; means associated with said retarding means for imposing a resistance to movement of said retarding means when said valve means moves away from said first position; and means associated with said retarding means for providing relatively unrestricted movement of said retarding means when said valve means is returned to said first position; and means for selectively rendering said retarding means ineffective to increase the rate of movement of said valve means away from said first position.

5. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in said chamber and arranged to impart movement to fluid therein; means operatively connected said valve means to said retarding means and to the other of said sprung and unsprung weight portions; means forming a passage for receiving fluid moved by said retarding means, said means including a movable restrictor; an electric actuator for said movable restrictor; and switch means in circuit with said electric actuator and including a first position for operating said electric actuator responsive to centrifugal force encountered by said vehicle in cornering in one direction and a second position for operating said electric actuator responsive to centrifugal force encountered by said vehicle in cornering in the other direction.

6. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low presure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in said chamber and arranged to impart movement to fluid therein said retarding means being movable in two directions away from and back to a centered position; means operatively connecting said valve means to said retarding means and to the other of said sprung and unsprung weight portions; means forming a passage for receiving fluid moved by said retarding means, said means including a restrictor; means forming a passage for fluid through said retarding means; a first fluid actuated check valve for said passage through said retarding means for preventing the passage of fluid through said retarding means when said retarding means is moving away from said centered position in one of said directions; a second fluid actuated check valve for preventing the passage of fluid through said retarding means when said retarding means is moved away from said centered position in the other direction, said check valves being inoperative when said retarding means is returned to said centered position.

7. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means movably carried in said chamber, said retarding means including a wall for moving fluid in one direction in said chamber and a second wall for moving fluid in another direction in said chamber, said retarding element being in engagement with the inner wall of said chamber and being movable in either of said directions from a normal position; means operatively connecting said valve means to said retarding means and to the other of said sprung and unsprung weight portions; means forming a passage for transporting fluid in said chamber from one side of said retarding means to the other side of said retarding means when said retarding means is moved in said chamber, said passage including a restrictor; conduit means through said retarding means for the flow of fluid through said retarding means when said retarding means is returning to said normal position after a departure thereof in either of said directions; a fluid actuated check valve for said conduit means through said retarding means for preventing the passage of fluid through said retarding means when said retarding means is moving fluid in one direction through said restrictor; and a second fluid actuated check valve for said conduit means through said retarding means for preventing the passage of fluid through said retarding means when said retarding means is moving fluid in the other direction through said restrictor.

8. Apparatus defined in claim 7 characterized by the inner wall of said chamber being provided with a recess, by said retarding means including a side wall covering said recess when said retarding means is in said normal position; and by said retarding means being arranged to interconnect said recess with said chamber when said retarding means is moved in either direction from said normal position, said conduit means through said retarding means having a port in said side wall in communication with said recess.

9. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in said chamber, said retarding means including a wall for moving fluid in one direction in said chamber and a second wall for moving fluid in another direction in said chamber, said retarding means being in engagement with the inner wall of said chamber and moveable in either of said directions from a normal position; means operatively connecting said valve means to said retarding means and to the other of said sprung and unsprung weight portions; means forming a first conduit for transporting fluid in said chamber from one side of said retarding means to the other side of said retarding means when said retarding means is moved in said chamber, said first conduit including a restrictor; passage means through said retarding means for the flow of fluid through said retarding means when said retarding means is returning to said normal position after a departure thereof in either of said directions; a fluid actuated check valve for said passage means through said retarding means for preventing the passage of fluid through said retarding means when said retarding means is moving fluid in one direction through said restrictor; a second fluid actuated check valve for said passage means through said retarding means for preventing the passage of fluid through said retarding means when said retarding means is moving fluid in the other direction through said restrictor; means forming a second conduit in parallel with said first conduit for conducting fluid from one side of said retarding means to the other side of said retarding means; and valve means for controlling the flow of fluid through said second conduit.

10. Apparatus defined in claim 9 characterized by the inner wall of said chamber being provided with a recess, by said retarding means including a side wall covering said recess when said retarding means is in said normal position, and by said retarding means being arranged to interconnect said recess with said chamber when said retarding means is moved in either direction from said normal position, said passage means through said retarding means having a port in said side wall in communication with said recess.

11. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in said chamber, the rate of movement of said retarding means being controlled by fluid in said chamber; means operatively connecting said valve means to said retarding means and to the other of said sprung and unsprung weight portions; means forming a passage connected to said chamber for receiving fluid engaged by said retarding means; valve means for controlling the flow of fluid through said passage; an electric actuator for said last mentioned valve means; and switch means in circuit with said electric actuator and including a first position for operating said electric actuator responsive to centrifugal force encountered by said vehicle in cornering in one direction and a second position for operating said electric actuator responsive to centrifugal force encountered by said vehicle in cornering in the other direction.

12. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in said chamber and arranged to impart movement to fluid therein; means operatively connecting said valve means to said retarding means and to the other of said sprung and unsprung weight portions; means forming a passage for receiving fluid moved by said retarding means; means forming a second chamber for said control means; a valve member moveably carried in said second chamber, said valve member including a portion for controlling the flow of fluid through said passage; means forming a second passage connecting said first chamber with said second chamber; and means for operating said valve member.

13. Apparatus defined in claim 12 characterized by the walls of said second chamber being surrounded by a solenoid, and said valve member forming a core for said solenoid, said valve member being moveably confined by said walls.

14. Apparatus defined in claim 12 characterized by the walls of said second chamber being surrounded by a solenoid, said valve member forming a core for said solenoid, said valve member being moveably confined by said walls, spring means constantly urging said valve member towards a position wherein said valve portion controls fluid flow through said passage and wherein said core is away from the magnetic center of said solenoid, a source of electrical energy for said solenoid, and a switch means for connecting said solenoid to said source for moving said valve portion away from flow controlling relationship with said passage.

15. Apparatus defined in claim 12 characterized by the walls of said second chamber being surrounded by a solenoid, said valve member forming a core for said solenoid, said valve member being moveably confined by said walls, and a third passage for conducting fluid from one end to the other end of said valve member, said third passage connecting a portion of said second chamber on one side of said valve member with a portion of said second chamber on the other side of said valve member.

16. Apparatus defined in claim 12 characterized by the walls of said second chamber being surrounded by a solenoid, said valve member forming a core for said solenoid, said valve member being moveably confined by said walls, and a third passage for conducting fluid in said second chamber from one end to the other end of said valve member, one end of said third passage communicating with said first chamber and the other end of said third passage communicating with said zone of relatively low pressure, and a fourth passage for delivering pressurized fluid from said pump to said first chamber.

17. Apparatus defined in claim 12 characterized by means for operatively connecting said valve means to said other of said sprung and unsprung portions including a resilient element.

18. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in said chamber and arranged to impart movement to fluid therein; means operatively connecting said valve means to said retarding means and to the other of said sprung and unsprung weight portions; means forming a passage for receiving fluid moved by said retarding means; a second valve means for controlling the flow of fluid through said passage; electrically actuated means for operating said second valve means; a source of electric energy for said electrically actuated means; an inertia responsive mercury switch for connecting and disconnecting said electrically actuated means with said source, said switch including a pair of contacts and a quantity of mercury for connecting and disconnecting said contacts; and means for retaining said electrically actuated means in an actuated position for a time interval after said quantity of mercury disconnects said contacts.

19. Apparatus defined in claim 18 characterized by said means for retaining said electrically actuated means in an actuated position being provided by a holding relay comprising a solenoid operated switch connected between said source and said electrically actuated means, and a capacitor in parallel with said solenoid.

20. In a suspension system for a vehicle having a sprung weight portion and an unsprung weight portion the combination of resilient means connected between said sprung and unsprung weight portions; means for varying the force exerted by said resilient means between said portions; actuating means for said means for varying said force, said actuating means being responsive to a condition to which said vehicle is subjected; time delay means for effecting a time delay between occurrence of said condition and operation of said actuating means; control means for rendering said time delay ineffective responsive to a second condition encountered by said vehicle; and holding means for maintaining said time delay ineffective for a time interval after said vehicle ceases to be subjected to said second condition, said control means being automatically actuated responsive to occurence of said second condition.

21. In a suspension system for a vehicle having a sprung weight portion and an unsprung weight portion, the combination of resilient means connected between said sprung and unsprung weight portions; means for varying the force exerted by said resilient means between said portions; actuating means for said means for varying said force, said actuating means being responsive to a condition to which said vehicle is subjected; time delay means for effecting a time delay between occurrence of said condition and operation of said actuating means; electrically actuated means for selectively rendering said time delay means operative or ineffective; a source of electrical energy for said electrically actuated means; a first switch means connected between said source and said electrically actuated means, said first switch means including a stationary contact and a moveable contact; means for moving said movable contact away from engagement with said stationary contact; a solenoid for moving said movable contact into engagement with said stationary contact; a second switch means for connecting and disconnecting said solenoid with said source; and a capacitor in parallel with said solenoid, said capacitor being connected to said source by said second switch means when said solenoid is so connected, and disconnected from said source by said second switch means when said solenoid is so disconnected.

22. Apparatus defined in claim 21 characterized by said second switch means including an inertia responsive switch.

23. Apparatus defined in claim 21 characterized by said second switch means including an inertia responsive operated by operation of the brakes of the vehicle.

24. Apparatus defined in claim 21 characterized by said second switch means including a first switch responsive to centrifugal force encountered by said vehicle and a second switch in parallel with said first switch.

25. In a suspension system for a vehicle having a sprung weight portion and an unsprung weight portion, the combination of resilient means connected between said sprung and unsprung portions, said resilient means including fluid actuated means for varying the force exerted by said resilient means between said portions; means providing a flow of fluid to and from said fluid actuated means; valve means for controlling said flow of fluid; valve actuating means for operating said valve means responsive to a condition to which said vehicle is subjected; retarding means for effecting a time delay in the actuation of said valve means; said retarding means including a piston movable in two directions from a centered position; means forming a passage for receiving fluid moved by departure of said piston from said centered position; a check valve in said piston, said check valve being closed when said piston departs from said centered position and adapted to open when said piston returns to said centered position; control means automatically operative responsive to a condition to which said vehicle is subjected for rendering said retarding means ineffective when said condition is encountered; and holding means for maintaining said time delay ineffective for a time interval after said vehicle ceases to be subjected to said second condition.

26. In a suspension system for a vehicle having a sprung weight portion and an unsprung weight portion, the combination of resilient means connected between said sprung and unsprung portions, said resilient means including fluid actuated means for varying the force exerted by said resilient means between said portions; means providing a flow of fluid to and from said fluid actuated means; valve means for controlling said flow of fluid; valve actuating means for operating said valve means responsive to a condition to which said vehicle is subjected; retarding means for effecting a time delay in the actuation of said valve means; electrically actuated means for selectively rendering said retarding means operative or inoperative; a source of electrical energy for said electrically actuated means; a first switch means connected between said source and said electrically actuated means, said first switch means including a stationary contact and a movable contact; means for moving said movable contact away from engagement with said stationary contact; a solenoid for moving said moveable contact into engagement with said stationary contact; a second switch means for connecting and disconnecting said solenoid with said source; and a capacitor in parallel with said solenoid, said capacitor being connected to said source by said second switch means when said solenoid is so connected, and disconnected from said source by said second switch means when said solenoid is so disconnected.

27. Apparatus defined in claim 26 characterized by said retarding means being fluid operated and by said electrically actuated means comprising a solenoid operated valve for controlling the flow of said fluid.

28. Apparatus for automatically controlling the suspension system of a vehicle while negotiating a curve for improving the cornering characteristics thereof, said vehicle being of the type wherein four unsprung weight portions are each independently connected to a sprung weight portion by a resilient means including a coil spring for supporting said sprung weight portion, which apparatus comprises; separate detector means for each of said unsprung portions, each detector means serving to sense relative movement, between its respective unsprung portion and said sprung portion, away from a normal configuration; separate control means for each of said resilient means, each control means being variably responsive to a respective one of said detector means for varying the force effect in a respective one of said resilient means, the magnitude of variation in said force effect being produced in proportion to the magnitude of inertia forces being encountered by said vehicle to maintain each of said unsprung portions at said normal configuration under various inertia forces being encountered, and said control means including a spring mount adapted to receive an end of said coil spring and to be moved relative to one of said weight portions; retarding means for varying the rate of actuation of said control means, said retarding means including a movable element and a passage for receiving fluid translated by movement of said movable element; a movable restrictor for said passage means; an electric actuator for shifting said movable restrictor; and switch means in circuit with said electric actuator and including a first position for operating said electric actuator responsive to centrifugal force encountered by said vehicle in cornering in one direction and a second position for operating said electric actuator responsive to centrifugal force encountered by said vehicle in cornering in the other direction.

29. Apparatus for automatically controlling the suspension system of a vehicle while negotiating a curve for improving the cornering characteristics thereof, said vehicle being of the type wherein four unsprung weight portions are each independently connected to a sprung weight portion by a resilient means for supporting said sprung weight portion, which apparatus comprises, separate detector means for each of said unsprung portions, each detector means serving to sense relative movement, between its respective unsprung portion and said sprung portion, away from a normal configuration; separate control means for each of said resilient means, each control means being variably responsive to a respective one of said detector means for varying the force effect in a respective one of said resilient means, the magnitude of variation in said force effect being produced in proportion to the magnitude of inertia forces being encountered by said vehicle to maintain each of said unsprung portions at said normal configuration under various inertia forces being encountered, and said control means including a mount for said resilient means, said mount being movably carried by one of said weight portions; retarding means for varying the rate of actuation of said control means, said retarding means including a piston movable in two directions from a centered position; means forming a passage for receiving fluid moved by departure of said piston from said centered position; and valve means for preventing the flow of fluid through said piston upon departure of said piston from said centered position and for permitting the free flow of fluid through said piston during movement of said piston back to said centered position.

30. Apparatus for controlling the suspension system of a vehicle having sprung and unsprung weight portions connected by resilient means, which apparatus comprises; fluid actuated means for varying the force exerted by said resilient means between said sprung and unsprung portions, said fluid actuated means including a mount for an end of said resilient means, said mount being moveable responsive to force exerted by fluid in said fluid actuated means; conduit means for conducting the pressurized fluid to said fluid actuated means; valve means in said conduit means for controlling the flow of fluid therein; and detector means operatively connected between said valve means and one of said weight portions, said detector means including a resilient connector disposed outside of said fluid actuated means and connected to one of said weight portions, said valve means being operatively responsive to relative movement between said weight portions; retarding means for varying the rate of actuation of said control means, said retarding means including a piston movable in two directions from a centered position; means forming a passage for receiving fluid moved by departure of said piston from said centered position; valve means for preventing the flow of fluid through said piston upon departure of said piston from said centered position and for permitting the free flow of fluid through said piston during movement of said piston back to said centered position; a movable restrictor for said passage; an electric actuator for shifting said movable restrictor; and switch means in circuit with said electric actuator and including a first position for operating said electric actuator responsive to centrifugal force encountered by said vehicle in cornering in one direction and a second position for operating said electric actuator responsive to centrifugal force encountered by said vehicle in cornering in the other direction.

31. In a fluid suspension system for a vehicle having suspension means, a pressure source, and a reservoir, automatic leveling mechanism having a variable response rate for regulating the pressure in said suspension means, said mechanism comprising an admission valve for communicating said suspension means with said pressure source, an exhaust valve for communicating said suspension means with said reservoir, actuating means for opening said admission and exhaust valves, means for retarding the admission or exhaust of pressurized fluid to or from the suspension means, means associated with said retarding means for eliminating the effect thereof, and means for continued elimination of the retarding effect of said retarding means for a predetermined time interval after said retarding effect has been initially eliminated.

32. Control apparatus for an automotive pneumatic suspension system comprising: a source of air pressure, means for the accommodation of exhaust air, an air spring communicable with said source and said means, a leveling device through which such communication is effectable, said device having a dash-pot mechanism associated therewith operating to introduce a time delay rendering the device normally ineffectual to admit or exhaust air from said spring for a predetermined period of time after operation thereof to an air admitting or exhausting position, and electrical means including a switch under the control of an inertia element for overruling said dashpot mechanism under predetermined dynamic conditions whereby, with the vehicle in motion, the rate of said spring is changed by the admission of air thereto or the discharge of air therefrom, said dashpot mechanism including a passage having a restrictor therein in the form of an armature retractable upon energization of the electric circuit including the inertia controlled switch.

33. Apparatus for controlling the suspension system of a vehicle having sprung and unsprung weight portions connected by resilient means, which apparatus comprises: fluid actuated means for varying the force exerted by said resilient means between said sprung and unsprung portions; conduit means for conducting pressurized fluid to said fluid actuated means; valve means in said conduit means for controlling the flow of fluid therein; detector means operatively connected between said valve means and one of said weight portions; retarding means for varying the rate of movement of said valve means by said detector means; control means for the rate of movement of said retarding means; an electric actuator for said control means; and switch means in circuit with said electric actuator and including a first position for operating said electric actuator responsive to inertia force encountered by said vehicle in accelerating and a second position for operating said electric actuator responsive to inertia force encountered by said vehicle in decelerating.

34. Control apparatus for an automotive pneumatic suspension system comprising: a source of air pressure, means for the accommodation of exhaust air, an air spring communicable with said source and said means, a leveling device through which such communication is effectable, said device having a dashpot mechanism associated therewith operating to introduce a time delay rendering the device normally ineffectual to admit or exhaust air from said spring for a predetermined period of time after operation thereof to an air admitting or exhausting position, an inertia element, and electrical means including a switch under the control of the inertia element for overruling said dashpot mechanism under predetermined dynamic conditions whereby, with the vehicle in motion, the rate of said spring is changed by the admission of air thereto or the discharge of air therefrom, said dashpot mechanism including a passage having a restrictor therein in the form of an armature and an electric coil, said armature being retractable upon energization of the electric circuit including the coil and the inertia controlled switch.

References Cited in the file of this patent

UNITED STATES PATENTS

| | | | |
|---|---|---|---|
| 1,179,015 | McCrosson | Apr. 11, | 1916 |
| 1,281,079 | Sears | Oct. 8, | 1918 |
| 1,464,680 | Lassen | Aug. 14, | 1923 |
| 1,641,640 | Myers | Sept. 16, | 1927 |
| 1,664,510 | Hughes | Apr. 3, | 1928 |
| 2,028,491 | Barrett | Jan. 21, | 1936 |
| 2,150,576 | Bell | Mar. 14, | 1939 |
| 2,361,575 | Thompson | Oct. 31, | 1944 |
| 2,490,311 | Rostu | Dec. 6, | 1949 |
| 2,687,311 | Nallinger | Aug. 24, | 1954 |
| 2,778,656 | May | Jan. 22, | 1957 |
| 2,849,225 | Lucien | Aug. 26, | 1958 |

FOREIGN PATENTS

| | | | |
|---|---|---|---|
| 518,848 | Great Britain | Mar. 8, | 1940 |